United States Patent
Chang et al.

(10) Patent No.: US 6,223,028 B1
(45) Date of Patent: Apr. 24, 2001

(54) ENHANCED METHOD AND SYSTEM FOR PROGRAMMING A MOBILE TELEPHONE OVER THE AIR WITHIN A MOBILE TELEPHONE COMMUNICATION NETWORK

(75) Inventors: Kim Chang, Richardson; Chenhong Huang; Robert E. Denman, both of Plano, all of TX (US)

(73) Assignee: Nortel Networks LTD, Montreal (CA)

( * ) Notice: Subject to any disclaimer, the term of this patent is extended or adjusted under 35 U.S.C. 154(b) by 0 days.

(21) Appl. No.: 09/042,951

(22) Filed: Mar. 17, 1998

Related U.S. Application Data (60) Provisional application No. 60/039,193, filed on Mar. 17, 1997.

(51) Int. Cl.[7] .................................................. H04B 3/00
(52) U.S. Cl. ........................... 455/419; 455/418; 455/403
(58) Field of Search .................................. 455/418, 419, 455/409, 432, 435, 403, 88, 73

(56) References Cited

U.S. PATENT DOCUMENTS

| | | | |
|---|---|---|---|
| 5,297,192 | * | 3/1994 | Gerszberg .............................. 455/419 |
| 5,301,223 | * | 4/1994 | Amadon et al. ...................... 455/409 |
| 5,794,142 | * | 8/1998 | Vanttila et al. ....................... 455/419 |
| 5,819,178 | * | 10/1998 | Cropper ................................. 455/433 |
| 5,854,978 | * | 12/1998 | Heidari ................................... 455/418 |
| 5,881,235 | * | 3/1999 | Mills ....................................... 455/418 |
| 5,887,254 | * | 3/1999 | Halonen ................................. 455/419 |
| 5,943,425 | * | 8/1999 | Mizikovski ............................. 380/25 |
| 5,950,130 | * | 9/1999 | Coursey ................................. 455/432 |
| 6,006,091 | * | 12/1999 | Lupien ................................... 455/435 |
| 6,014,561 | * | 1/2000 | Molne ..................................... 455/419 |
| 6,029,065 | * | 2/2000 | Shah ....................................... 455/414 |
| 6,047,071 | * | 4/2000 | Shah ....................................... 455/410 |
| 6,104,924 | * | 8/2000 | Shirai ..................................... 455/418 |

* cited by examiner

Primary Examiner—Nay Maung
Assistant Examiner—Sonny Trinh
(74) Attorney, Agent, or Firm—Bruce E. Garlick; James A. Harrison (57) ABSTRACT

An improved method for programming a mobile telephone over the air within a mobile telephone communication network is disclosed. The mobile telephone communication network includes an over-the-air function, a customer service center, a mobile switching center, a base station controller, and multiple base transceiver stations. The over-the-air function, using the mobile switching center, the base station controller, and one of the base transceiver stations for transport, initially sends a request over the air to a mobile telephone within the mobile telephone communication network to interrogate the mobile telephone's protocol capability. In response to the request, the mobile telephone sends a protocol capability response message over the air back to the over-the-air function. The protocol capability response message includes a BAND_MODE_CAP field that describes the band and mode capability information of the mobile telephone. In addition, the protocol capability response message may also includes a SERVICE_OPTION field that describes the service options supported by the mobile telephone.

30 Claims, 1 Drawing Sheet

Fig. 1

ENHANCED METHOD AND SYSTEM FOR PROGRAMMING A MOBILE TELEPHONE OVER THE AIR WITHIN A MOBILE TELEPHONE COMMUNICATION NETWORK

This application claims Benefit of Provisional application Ser. No. 60/039,193 filed Mar. 17, 1997.

BACKGROUND OF THE INVENTION

1. Technical Field

The present invention relates to a method and system for servicing a wireless communication network in general, and in particular to a method and system for servicing a mobile telephone communication network. Still more particularly, the present invention relates to an enhanced method and system for programming a mobile telephone over the air within a mobile telephone communication network.

2. Description of the Prior Art

A mobile telephone communication network is an integrated network comprising a land-based wireline telephone network and a composite wired-wireless network. The land-based wireline network is the traditional telephone system in which each telephone subscriber is connected to a central switching network, commonly known as the public switched telephone network (PSTN), capable of handling thousands of simultaneous telephone calls. The composite wire-wireless network is the basis of today's mobile telephone communication network. The heart of the composite wire-wireless network is a wireless-specific switch, which is generally known as a mobile switching center (MSC), derived from PSTN switches by adding several functions that are pertinent to the mobile telephone communication network. Along with the MSC, a base station controller (BSC) is utilized to control base stations located at different convenient sites within the mobile telephone communication network. The coverage of each base station varies from less than a kilometer to several kilometers, depending on the propagation environment and traffic density.

A mobile telephone communication network is designed to serve mobile telephone subscribers within a given geographic area, known as a metropolitan service area (MSA). A typical mobile telephone communication network has the capacity to serve thousands of mobile telephone subscribers within a large MSA. Mobile telephone subscribers are expected to subscribe services from a mobile telephone service provider for services within a specific MSA. When the mobile telephone subscriber operates within its subscribed MSA, the mobile telephone subscriber is referred to as a home mobile, while outside of its subscribed MSA the mobile telephone subscriber is referred to as a roamer.

The first objective of a mobile telephone service is to provide dial access between home mobiles and any other telephones (landing or mobile) reached through the PSTN. The second objective of the mobile telephone service is to provide access to and from roamers. In order to satisfy both of the above-mentioned objectives, it is essential for the subscriber's mobile telephone to have a standard 10-digit telephone number, including a three-digit area code plus a seven-digit directory number. A 34-bit binary mobile identification number (MIN), which may sometimes be derived from the 10-digit telephone number, identifies an individual mobile telephone subscriber within the mobile telephone communication network.

For calls originated by a mobile telephone subscriber, the mobile telephone communication network not only needs the dialed digits but also requires the originating mobile telephone subscriber's identification. Such identification, including the MIN, is stored in a number assignment module (NAM), which is part of the mobile telephone. Under the prior art, the NAM is programmed by a mobile telephone service provider when the mobile telephone subscriber initially subscribes for service. Once the NAM has been programmed, the mobile telephone must be physically brought back to the original service provider for a new service provider) in order to change the information within the NAM.

With the advent of the Over-the-Air Service provisioning (OTASP), a mobile telephone subscriber is provided with more flexibility. As the term "over-the-air service" implies, OTASP allows some of the operating parameters within a mobile telephone to be changed by a mobile telephone communication network over the air via an over-the-air function/customer service center (OTAF/CSC). Nevertheless, once a mobile telephone has been initially programmed, the OTAF/CSC still has no convenient way of knowing the capability of the mobile telephone that is in use, such as whether the mobile telephone supports cellular or personal communication service, dual-band or single band, analog or digital, etc. This information is essential for the OTAF/CSC to determine which preferred roaming list (PRL) and NAM indicator block are to be constructed and downloaded to the requesting mobile telephone in addition, when a mobile telephone is to be activated for additional service, the OTAF/CSC again has no convenient way of knowing which service options the mobile telephone may support. This service options information is critical for allowing the OTAF/CSC to initiate appropriate provisioning of the mobile telephone in a home locate register (HLR), when the mobile telephone subscriber wishes to subscribe to some special services such as short message services (SMS). Consequently, it is desirable to provide an improved method for programming a mobile telephone over the air within a mobile telephone communication network.

SUMMARY OF THE INVENTION

In view of the foregoing, it is therefore an object of the present invention to provide an improved method for servicing a wireless communication network.

It is another object of the present invention to provide an improved method and system for servicing a mobile telephone communication network.

It is yet another object of the present invention to provide an improved method and system for programming a mobile telephone over the air within a mobile telephone communication network.

In accordance with a method and system of the present invention, a mobile telephone communication network includes an over-the-air function, a customer service center, a mobile switching center, a base station controller, and multiple base transceiver stations. The over-the-air function, using the mobile switching center, base station controller and one of the base transceiver stations for transport, initially sends a request over the air to a mobile telephone within the mobile telephone communication network to interrogate the mobile telephone's protocol capability. In response to the request, the mobile telephone sends a protocol capability response message over the air back to the over-the-air function. The protocol capability response message includes a BAND_MODE_CAP field that describes the band and mode capability information of the mobile telephone. In addition, the protocol capability response message may also includes a SERVICE_OPTION field that describes the service options supported by the mobile telephone.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawing, wherein.

DETAILED DESCRIPTION OF A PREFERRED EMBODIMENT

Figure 1:
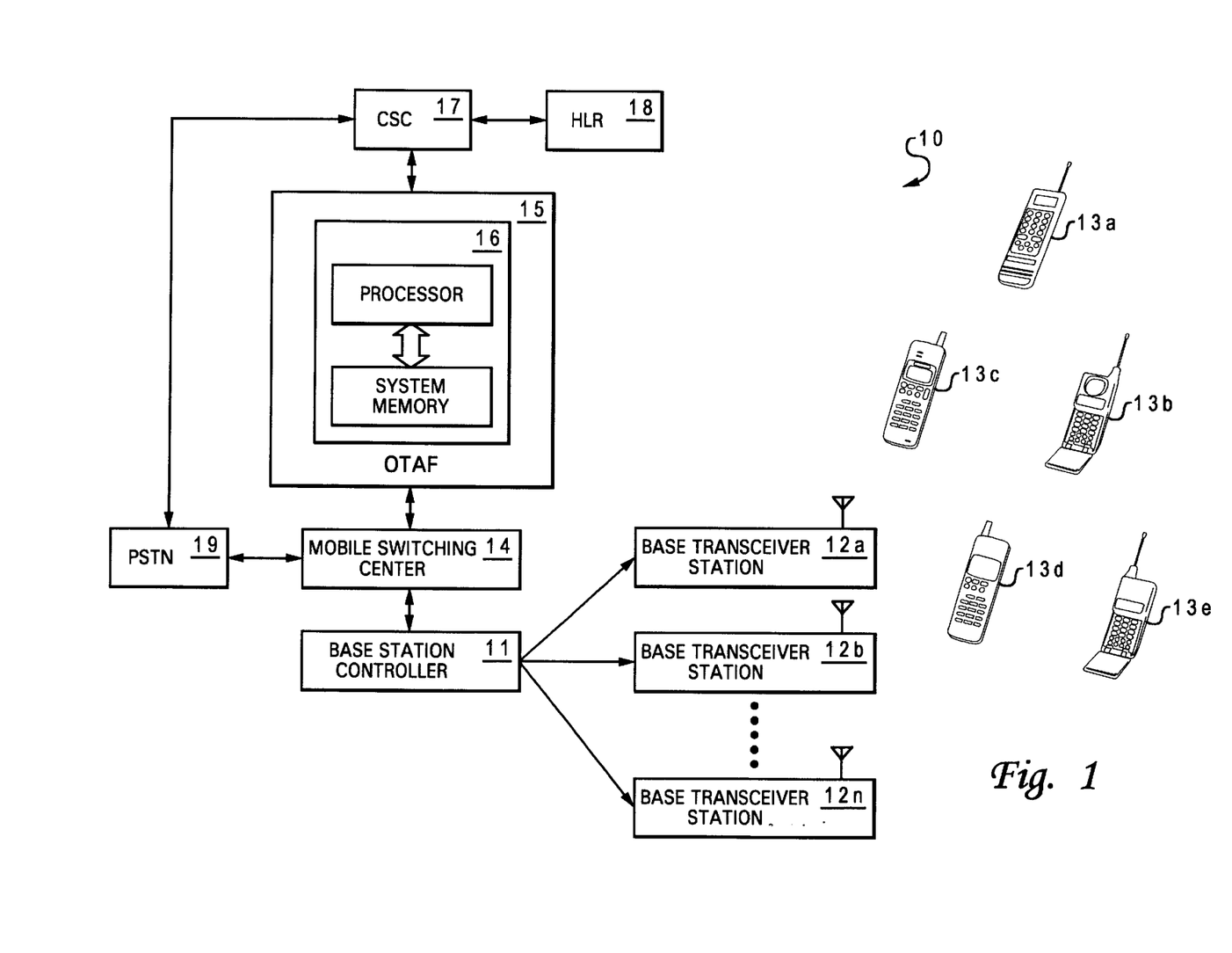
FIG. 1 is a pictorial diagram of a mobile telephone communication network in which a preferred embodiment of the present invention may be implemented.

Referring now to the drawings and in particular to FIG. 1, there is depicted a pictorial diagram of a mobile telephone communication network 10 in which a preferred embodiment of the present invention may be implemented. Communication network 10 may utilize an analog protocol such as advanced mobile phone service (AMPS) or a digital protocol such as code-division multiple access (CDMA). As shown, communication network 10 includes several base transceiver stations (BTSs) 12a–12n located at various locations within communication network 10. Each of BTSs 12a–12n is controlled by a base station controller (BSC) 11. Within the service area of communication network 10, there are several mobile telephones, such as mobiles 13a, 13b, 13c, 13d and 13e. Constant communications must be maintained between a mobile and at least one of BTSs 12a–12n when the mobile is being utilized to communicate with another telephone.

Coupled to BSC 11 is a mobile switching center (MSC) 14 for supporting multiple-access technologies such as AMPS and CDMA, and connectivity to a public switched telephone network (PSTN) 19. In addition, MSC 14 supports various call processing functions. Along with BSC 11 and MSC 14, an Over-the-Air Function (OTAF) 15 allows a mobile telephone subscriber to activate and program a mobile, such as one of mobiles, 13a–13e, without the intervention of a third party. OTAF 15 also allows a mobile telephone service provider to modify, over the air, certain operating parameters previously stored within mobiles 13a–13e. These parameters include number assignment module (NAM) indicators such as a mobile identification number (MIN) and a mobile directory number, a preferred roaming list, and a service programming code. A detailed specification for the OTASP operation can be found in "Over-the-Air Service Provisioning of Mobile Stations in Spread Spectrum Systems" (TIA/EIA/IS-683-A), which is incorporated herein by reference.

Typically, a computer system 16 is located within OTAF 15 for performing the over-the-air programming function. Computer system 16 may be, for example, a midrange computer having a processor and a main memory as is well-known to those skilled in the art. The software for performing the over-the-air programming commonly resides within computer system 16. In addition, OTAF 15 is coupled to a customer service center (CSC) 17, which connects to a home locate register (HLR) 18. CSC 17 initiates OTAF operations, and provides an operator with the means for voice conversations with the subscriber whose mobile is being programmed. The voice data exchanged between the operator and the subscriber transits from CSC 17, PSTN 19, MSC 14, BSC 11, and BTS 12a–12n to mobiles 13a–13e. CSC 17 also receives status from OTAF 15 related to the programming of mobiles 13a–13e. Finally, CSC 17 may initiate creation of a modification to the subscriber's profile in HLR 18. The subscribers's profile includes an identification of the mobile's directory number, MIN, and various service options.

As mentioned previously, an appropriate NAM indicator needs to the programmed into a mobile for the proper functioning of the mobile. There are two types of NAM indicates: (1) a Personal Communication System (PCS) indicator for mobiles capable of operating in the PCS band (1.9 GHz), and (2) a cellular indicator for mobiles capable of operating in the cellular band (800 MHz). In addition, an appropriate preferred roaming list (PRL) is required for roaming support of the mobile. A PRL is essentially a system table for assisting the mobile to locate a preferred mobile communication network upon power-on of the mobile when it is located outside the mobile's subscribed service area. A PRL can include entries specifying mobile communication networks in different regions, including the bands and operation modes.

Any one of mobiles 13a–13e within mobile telephone communicates network 10 may be programmed by OTAF 16 via one of base transceiver stations 12a–12n. Preferably, MSC 14, BSC 11, and base transceiver stations 12a–12n simply provide transport between OTAF 15 and mobiles 13a–13e for the actual exchanges of the protocol capability requests and responses. Before programming, OTAF 15 needs to send a request to a mobile, via one of BTSs 12a–12n, to interrogate the mobile's protocol capability, and the mobile will respond with a protocol capability response message. With reference now to Table I, there is depicted a list of parameters in a protocol capability response message from a mobile to a base transceiver station over the air within mobile telephone communication network 10, in accordance with a preferred embodiment of the present invention.

TABLE I

| Field | Length (bits) |
| --- | --- |
| OTASP_MSG_TYPE | 8 |
| MOB_FIRM_REV | 16 |
| MOB_MODEL | 8 |
| NUM_FEATURES | 8 |
| FEATURE_ID | 8 |
| FEATURE_P_RFV | 8 |
| BAND_MODE_CAP | 8 |
| NUM_SO | 8 |
| SERVICE_OPTION | 16 |

The OTASP_MSG_TYPE field describes a message type of OTASP compliant data. The OTASP_MSG_TYPE field is an eight-bit field, and is preferably set by the mobile to "00000110" to indicate the present message as a protocol capability response message.

The MOB_FIRM_REV field describes a firmware revision number of the mobile. The MOB_FIRM_REV field is a 16-bit field, and is preferably set by the mobile to the value of the permanent mobile station indicator, $MOB\_FIRM\_REV_p$.

The MOB_MODEL field describes a model number of the mobile assigned by the mobile manufacturer. The MOB_MODEL field is an eight-bit field, and is preferably set by the mobile to the value of the permanent mobile station indicator, $MOB\_MODEL_p$.

The NUM_FEATURES field describes the number of features supported by the mobile. The NUM_FEATURES field is an eight-bit field, and is preferably set by the mobile to indicate the total length of the subsequent bits for indicating all the features supported by the mobile. Each individual feature is described by two fields, namely, a FEATURE_ID field and a FEATURE_P_REV field. Hence, if there are two features, NUM_FEATURES field will be set to "00000010" along with two FEATURE_ID fields and two FEATURE_P_REV fields, interleaving each other (i.e., FEATURE_ID field, FEATURE_P_REV field, FEATURE_ID field, FEATURE_P_REV field).

The FEATURE_ID field describes a feature identifier. The FEATURE_ID field is an eight-bit field, and is preferably set according to one of the entries under the FEATURE_ID column in Table II to indicate a specific feature supported by the mobile.

TABLE II

| Features | FEATURE_ID | FEATURE_P_REV |
|---|---|---|
| NAM download | 00000000 | 00000010 or less |
| key exchange | 00000001 | 00000001 or less |
| system selection for preferred roaming | 00000010 | 00000000 |
| service programming lock | 00000011 | 00000001 or less |
| reserved for future standardization | 00000100 through 10111111 | |
| available for manufacturer-specific features | 11000000 through 11111110 | |
| reserved | 11111111 | |

The FEATURE_P_REV field describes a feature protocol version. The FEATURE_P_REV field is an eight-bit field, and is preferably set according to one of the entries under the FEATURE_P_REV column in Table II to indicate a protocol version of the specific feature supported by the mobile.

Even with the OTASP, the OTAF/CSC still has no convenient way of knowing the mobile's capability, such as whether the mobile communicates utilizing a cellular band or a PCS band, with dual band or single band, an AMPS mode or a CDMA mode, or with dual mode or single mode, unless the mobile can relate such information to the OTAF/CSC. The above-mentioned information related to the mobile's capability is essential for the OTAF/CSC to determine which PRL(s) and NAM indicator block(s) should be downloaded to the requesting mobile. Under the prior art, there are only two options available to the mobile telephone service provider. This first option is to construct a global PRL that can be utilized by all mobiles, regardless of their capabilities, and the second option is to establish some sort of databases associated with the electronic serial number or the model number of the mobiles. Needless to say, extraneous information is likely to be downloaded to the requesting mobile under the first option, and the databases in the second option are typically quite large and are probably difficult to maintain.

In accordance with a preferred embodiment of the present invention, a BAND_MODE_CAP field is utilized to allow the mobile telephone service provider to obtain the capability of the mobile over the air, such that a custom PRL and NAM indicator block specific to the mobile's capability can be downloaded to the mobile. The BAND_MOBE_CAP field describes the band/mode capability information of the mobile. The BAND_MODE_CAP field is an eight-bit field, and is preferably set by the mobile to indicate the mobile's band and mode capabilities, such as whether the mobile communicates utilizing a cellular band or a PCS band, with dual band or single band, and whether the mobile utilizes an AMPS mode or a CDMA mode, with dual mode or single mode. The BAND_MODE_CAP field includes several subfields as shown in Table III. Subfield "band Class 0 AMPS" indicates whether the mobile is capable of AMPS mode in a cellular band. Subfield "band Class 0 CDMA" indicates whether the mobile is capable of CDMA mode in a cellular band. Subfield "band Class 1 CDMA" indicates whether the mobile is capable of CDMA mode in a PCS band. Each subfield within BAND_MODE_CAP field is preferably set to "1" if the corresponding type of band/mode is supported by the mobile. The reserved subfield is preferably set to "0000."

Table III

| Description | Length (bits) |
|---|---|
| band Class 0 AMPS | 1 |
| band Class 0 CDMA | 1 |
| band Class 1 CDMA | 1 |
| reserved | 5 |

In addition, when a mobile is to be activated for additional service, the OTAF has no convenient way of knowing which service options the mobile may support. This service options information is critical for allowing the OTAF to initiate certain provisioning of the mobile in a home locate register (HLR), when the mobile telephone subscriber wishes to subscribe to some special services such as short message services. Thus, the NUM—SO field is utilized to describe a number of service options available to the mobile.

The NUM_SO field is an eight-bit field, and is preferably set to the number of service options supported by the mobile. Similar to the NUM_FEATURES field, the NUM_SO field indicates the total number of the subsequent SERVICE_OPTION field(s) for indicating all the service options supported by the mobile.

The SERVICE_OPTION field described all supported service options. The SERVICE_OPTION field is a 16-bit field, and is preferably set to the service option code column in accordance with Table IV. The type of service associated with each service option code in also described in Table IV.

TABLE IV

| service option code (in decimal) | Designated/Type of Service |
|---|---|
| 1 | Basic Variable Rate Voice Service (8 kbps) |
| 2 | Mobile Station Loopback (8 kbps) |
| 3 | Enhanced Variable Rate Voice Service (8 kbps) |
| 4 | Asynchronous Data Service (9.6 kbps) |
| 5 | Group 3 Facsimile (9.6 kbps) |
| 6 | Short Message Services (rate set 1) |
| 7 | Packet Data Service: Internet or ISO Protocol Stack |
| 8 | Packet Data Service: CDPD Protocol Stack |
| 9 | Mobile Station Loopback (13 kbps) |
| 10 | STU-III Transparent Service |
| 11 | STU-III Non-Transparent Service |
| 12 | Asynchronous Data Service (14.4 or 9.6 kbps) |
| 13 | Group 3 Facsimile (14.4 or 9.6 kbps) |
| 14 | Short Message Services (rate set 2) |
| 15 | Packet Data Service: Internet or ISO Protocol Stack (14.4 kbps) |

TABLE IV-continued

| service option code (in decimal) | Designated/Type of Service |
| --- | --- |
| 16 | Packet Data Service: CDPD Protocol Stack (14.4 kbps) |
| 17 | High Rate Voice Service (13 kbps) |
| 18 | Over-the-Air Parameter Administration (Rate Set 1) |
| 19 | Over-the-Air Parameter Administration (Rate Set 2) |
| 20 | Group 3 Analog Facsimile (Rate Set 1) |
| 21 | Group 3 Analog Facsimile (Rate Set 2) |
| 22–4099 | Reserved for standard service options |
| 4100 | Asynchronous Data Service Revision 1 (9.6 or 14.4 kbps) |
| 4101 | Group 3 Facsimile Revision 1 (9.6 or 14.4 kbps) |
| 4102 | Reserved for standard service option |
| 4103 | Packet Data Service: Internet or ISO Protocol Stack Revision 1 (9.8 or 14.4 kbps) |
| 4104 | Packet Data Service: CDPD Protocol Stack Revision 1 (9.6 or 14.4 kbps) |
| 4105–32.767 | reserved for standard service options |

As has been described, the present invention provides an enhanced method for programming a mobile telephone over the air within a mobile telephone communication network. In addition to mobiles, the present invention is also applicable to fixed wireless access applications. The computer system for implementing the present invention preferably resides in an OTAF. It is important to note that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for programming a mobile telephone over the air within a mobile telephone communication network, said mobile telephone communication network includes an over-the-air function, a customer service center, a mobile switching center, a base station controller, and a plurality of base transceiver stations, said method comprising the steps of:

establishing a communication path between a mobile telephone and the over-the-air function, wherein the communication path includes an over the air path between said mobile telephone and one of said plurality of base transceiver stations;

sending a request from the over-the-air function to said mobile telephone via the communication path to interrogate said mobile telephone's operating capabilities;

receiving a protocol capability response message from said mobile telephone via the communication path by the over-the-air function that describes the band and mode capabilities of said mobile telephone;

the over-the-air function determining operational parameters for said mobile telephone based upon the band and mode capabilities of said mobile telephone, wherein the operational parameters include a preferred roaming list and a number assignment module indicator block; and the over-the air function communicating the operational parameters to said mobile telephone via the communication path.

2. The method according to claim 1, wherein the protocol capability response message includes a BAND_MODE_CAP field that includes an analog cellular band subfield describing analog cellular band operations supported by said mobile telephone, a digital cellular band subfield describing cellular band operations supported by said mobile telephone, and a digital personal communication service band subfield describing personal communicating service band operations supported by said mobile telephone.

3. The method according to claim 1, wherein the preferred roaming list and the number assignment module indicator block are communicated to said mobile telephone in separate messages.

4. The method according to claim 1, wherein said protocol capability response message further describes a number of service options supported by said mobile telephone.

5. The method according to claim 4, wherein:

said protocol capability response message includes a NUM_SO field that indicates a number of service options supported by said mobile telephone;

or each of the number of service options supported by said mobile telephone, the protocol capability response message includes a SERVICE_OPTION field, wherein each SERVICE_OPTION field indicates a service option supported by said mobile telephone.

6. The method according to claim 5, wherein the over-the-air function uses the contents of the protocol capability response message to provision services for said mobile telephone.

7. The method according to claim 6, wherein data from the protocol capability response message is used for said mobile telephone's service provisioning at said mobile telephone's home location register.

8. The method according to claim 1, wherein said mobile telephone communication network may be an advanced mobile phone service or a code-division multiple access mobile telephone communication network.

9. A mobile telephone communication system for programming a mobile telephone over the air within a mobile telephone communication network, said mobile telephone communication network includes an over-the-air function, a customer service center, a mobile switching center, a base station controller, and a plurality of base transceiver stations, said mobile telephone communication system comprising:

means for establishing a communication path between a mobile telephone and the over-the-air function, wherein the communication path includes an over the air path between said mobile telephone and one of said plurality of base transceiver stations;

means for sending a request from the over-the-air function to said mobile telephone via the communication path to interrogate said mobile telephone's operating capabilities;

means for receiving a protocol capability response message from said mobile telephone responding via the communication path by the over-the-air function that describes the band and mode capabilities of said mobile telephone;

means for the over-the-air function determining operational parameters for said mobile telephone based upon the band and mode capabilities of said mobile telephone, wherein the operational parameters include a preferred roaming list and a number assignment module indicator block; and means for the over-the air function communicating the operational parameters to said mobile telephone via the communication path.

10. The mobile telephone communication system according to claim 9, wherein the protocol capability response message includes a BAND_MODE_CAP field that includes an analog cellular band subfield describing analog cellular band operations supported by said mobile telephone, a digital cellular band subfield describing cellular band operations supported by said mobile telephone, and a digital personal communication service band subfield describing personal communication service band operations supported by said mobile telephone.

11. The mobile telephone communication system according to claim 9, wherein the preferred roaming list and the number assignment module indicator block are communicated to said mobile telephone in separate messages.

12. The mobile telephone communication system according to claim 9, wherein said protocol capability response message further describes a number of service options supported by said mobile telephone.

13. The mobile telephone communication system according to claim 12, wherein:

said protocol capability response message includes a NUM_SO field that indicates a number of service options supported by said mobile telephone;

for each of the number of service options supported by said mobile telephone, the protocol capability response message includes a SERVICE_OPTION field, wherein each SERVICE_OPTION field indicates a service option supported by said mobile telephone.

14. The mobile telephone communication system according to claim 13, wherein the over-the-air function uses the contents of the protocol capability response message to provision services for said mobile telephone.

15. The mobile telephone communication system according to claim 14, wherein data from the protocol capability response message is used for said mobile telephone's service provisioning at said mobile telephone's home location register.

16. The mobile telephone communication system according to claim 9, wherein said mobile telephone communication network is a code-division multiple access mobile telephone communication network.

17. A mobile telephone for operating within a mobile telephone communication network, said mobile telephone communication network includes an over-the-air function, a customer service center, a mobile switching center, a base station controller, and a plurality of base transceiver stations, said mobile telephone comprising:

means for establishing a communication path with the over-the-air function, wherein the communication path includes an over the air path between said mobile telephone and one of said plurality of base transceiver stations;

means for receiving a request from the over-the-air function to said mobile telephone via the communication path to interrogate said mobile telephone's operating capabilities;

means for responding via the communication path to the over-the-air function with a protocol capability response message that describes the band and mode capabilities of said mobile telephone;

means for receiving operational parameters from the over-the-air function via the communication path, wherein the operational parameters are based upon the band and mode capabilities of said mobile telephone as reported in the protocol capability response message and include a preferred roaming list and a number assignment module indicator block; and means for subsequently operating said mobile telephone according to the operational parameters received from the over-the-air function.

18. The mobile telephone according to claim 17, wherein the protocol capability response message includes a BAND_MODE_CAP field that includes an analog cellular band subfield describing analog cellular band operations supported by said mobile telephone, a digital cellular band subfield describing cellular band operations supported by said mobile telephone, and a digital personal communication service band subfield describing personal communication service band operations supported by said mobile telephone.

19. The mobile telephone according to claim 17, wherein said protocol capability response message further describes a number of service options supported by said mobile telephone.

20. The mobile telephone according to claim 19, wherein:

said protocol capability response message includes a NUM_SO field the indicates a number of service options supported by said mobile telephone;

for each of the number of service options supported by said mobile telephone, the protocol capability response message includes a SERVICE_OPTION field, wherein each SERVICE_OPTION field indicates a service option supported by said mobile telephone.

21. The mobile telephone according to claim 17, wherein the preferred roaming list and the number assignment module indicator block are communicated to said mobile telephone in separate messages.

22. The mobile telephone according to claim 19, wherein the over-the-air function uses the contents of the protocol capability response message to provision services for said mobile telephone.

23. The mobile telephone according to claim 22, wherein data from the protocol capability response message is used for said mobile telephone's service provisioning at said mobile telephone's home location register.

24. A method for operating a mobile telephone within a mobile telephone communication network, said mobile telephone communication network includes an over-the-air function, a customer service center, a mobile switching center, a base station controller, and a plurality of base transceiver stations, said method comprising the steps of:

establishing a communication path with the over-the-air function, wherein the communication path includes an over the air path between said mobile telephone and one of said plurality of base transceiver stations;

receiving a request from the over-the-air function to said mobile telephone via the communication path to interrogate said mobile telephone's operating capabilities;

responding via the communication path to the over-the-air function with a protocol capability response message the describes the band and mode capabilities of said mobile telephone;

receiving operational parameters from the over-the-air function, wherein the operational parameters are based upon the band and mode capabilities of said mobile telephone contained in the protocol capability response message, wherein the operational parameters include a preferred roaming list and a number assignment module indicator block; and substantially operating said mobile telephone according to the operational parameters received from the over-the-air function.

25. The method according to claim 24, wherein the protocol capability response message includes a BAND_MODE_CAP field that includes an analog cellular band subfield describing analog cellular band operations supported by said mobile telephone, a digital cellular band subfield described cellular band operations supported by said mobile telephone, and a digital personal communication service band subfield describing personal communication service band operations supported by said mobile telephone.

26. The method according to claim 24, wherein the preferred roaming list and the number assignment module indicator block are communicated to said mobile telephone in separate messages.

27. The method according to claim 24, wherein said protocol capability response message further describes a number of service options supported by said mobile telephone.

28. The method according to claim 26, wherein:

said protocol capability response message includes a NUM_SO field that indicates a number of service options supported by said mobile telephone;

for each of the number of service options supported by said mobile telephone, the protocol capability response message including a SERVICE_OPTION field, wherein each SERVICE_OPTION field indicates a service option supported by said mobile telephone.

29. The method according to claim 26, wherein the over-the-air function uses the contents of the protocol capability response message to provision services for said mobile telephone.

30. The method according to claim 26, wherein data from the protocol capability response message is used for said mobile telephone's service provisioning at said mobile telephone's home location register.

* * * * *

UNITED STATES PATENT AND TRADEMARK OFFICE
CERTIFICATE OF CORRECTION

PATENT NO. : 6,223,028 B1
DATED : April 24, 2001
INVENTOR(S) : Kim Chang, Chenhong Huang, Robert E. Denman It is certified that error appears in the above-identified patent and that said Letters Patent is hereby corrected as shown below:

Column 1,
Line 55, replace "landing" with -- land --.

Column 4,
Line 12, replace "indicates" with -- indicator --.

Claim 5,
Line 5, replace "or each" with -- for each --.

Claim 24,
Line 16, replace "the describes" with -- that describes --.

Signed and Sealed this

Ninth Day of October, 2001

*Attest:*

NICHOLAS P. GODICI
*Attesting Officer*  *Acting Director of the United States Patent and Trademark Office*

UNITED STATES PATENT AND TRADEMARK OFFICE
CERTIFICATE OF CORRECTION

PATENT NO. : 6,223,028 B1
DATED : April 24, 2001
INVENTOR(S) : Kim Chang, Chenhong Huang, Robert E. Denman It is certified that error appears in the above-identified patent and that said Letters Patent is hereby corrected as shown below:

Column 1,
Line 55, replace "landing" with -- land --.

Column 4,
Line 12, replace "indicates" with -- indicator --.

Claim 5,
Line 5, replace "or each" with -- for each --.

Claim 24,
Line 16, replace "the describes" with -- that describes --.

Signed and Sealed this

Eleventh Day of December, 2001

*Attest:*

NICHOLAS P. GODICI
*Attesting Officer*    *Acting Director of the United States Patent and Trademark Office*

US006223028C1

(12) EX PARTE REEXAMINATION CERTIFICATE (5482nd)
United States Patent
Chang et al.

(10) Number: US 6,223,028 C1
(45) Certificate Issued: Aug. 29, 2006

(54) ENHANCED METHOD AND SYSTEM FOR PROGRAMMING A MOBILE TELEPHONE OVER THE AIR WITHIN A MOBILE TELEPHONE COMMUNICATION NETWORK

(75) Inventors: Kim Chang, Richardson, TX (US);
Chenghong Huang, Plano, TX (US);
Robert E. Denman, Plano, TX (US)

(73) Assignee: Nortel Networks Limited, Brampton (CA)

Reexamination Request:
No. 90/006,578, Mar. 25, 2003

Reexamination Certificate for:
Patent No.: 6,223,028
Issued: Apr. 24, 2001
Appl. No.: 09/042,951
Filed: Mar. 17, 1998

Certificate of Correction issued Oct. 9, 2001.

Certificate of Correction issued Dec. 11, 2001.

Related U.S. Application Data
(60) Provisional application No. 60/039,193, filed on Mar. 17, 1997.

(51) Int. Cl.
*H04B 3/00* (2006.01)

(52) U.S. Cl. .................. 455/419; 455/418; 455/403
(58) Field of Classification Search ............... None
See application file for complete search history.

(56) References Cited

U.S. PATENT DOCUMENTS 5,608,779 A * 3/1997 Lev et al. .............. 455/436
5,761,618 A * 6/1998 Lynch et al. ............ 455/419
5,878,339 A * 3/1999 Zicker et al. ........... 455/419
5,995,829 A * 11/1999 Broderick ............... 455/418
6,144,849 A * 11/2000 Nodoushani et al. ..... 455/419

OTHER PUBLICATIONS

Publication of TIA/EIA/IS–95–A, Feb. 1996, pp. 6–266, 6–267, 6–324, 6–326 and 6–327.*

TIA/EIA/IS–683, Feb. 1997, TIA/EIA Interim Standard, "Over–the–Air Service Positioning of Mobile Stations in Wideband Spread Spectrum Systems".*

* cited by examiner

*Primary Examiner*—Quochien B. Vuong (57) ABSTRACT

An improved method for programming a mobile telephone over the air within a mobile telephone communication network is disclosed. The mobile telephone communication network includes an over-the-air function, a customer service center, a mobile switching center, a base station controller, and multiple base transceiver stations. The over-the-air function, using the mobile switching center, the base station controller, and one of the base transceiver stations for transport, initially sends a request over the air to a mobile telephone within the mobile telephone communication network to interrogate the mobile telephone's protocol capability. In response to the request, the mobile telephone sends a protocol capability response message over the air back to the over-the-air function. The protocol capability response message includes a BAND_MODE_CAP field that describes the band and mode capability information of the mobile telephone. In addition, the protocol capability response message may also includes a SERVICE_OPTION field that describes the service options supported by the mobile telephone.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–23 is confirmed.

Claim 24 is determined to be patentable as amended.

Claims 25–29 and 30, dependent on an amended claim, are determined to be patentable.

24. A method for operating a mobile telephone within a mobile telephone communication network, said mobile telephone communication network includes an over-the-air function, a customer service center, a mobile switching center, a base station controller, and a plurality of base transceiver stations, said method comprising the steps of:

establishing a communication path with the over-the-air function, wherein the communication path includes an over the air path between said mobile telephone and one of said plurality of base transceiver stations;

receiving a request from the over-the-air function to said mobile telephone via the communication path to interrogate said mobile telephone's operating capabilities;

responding via the communication path to the over-the-air function with a protocol capability response message that describes the band and mode capabilities of said mobile telephone;

receiving operational parameters from the over-the-air function, wherein the operational parameters are based upon the band and mode capabilities of said mobile telephone contained in the protocol capability response message, wherein the operational parameters include a preferred roaming list and a number assignment module indicator block; and

[substantially] *subsequently* operating said mobile telephone according to the operational parameters received from the over-the-air function.

* * * * *